Dec. 31, 1935.  J. BIJUR  2,025,713
LUBRICATION
Filed Feb. 28, 1931  3 Sheets-Sheet 1
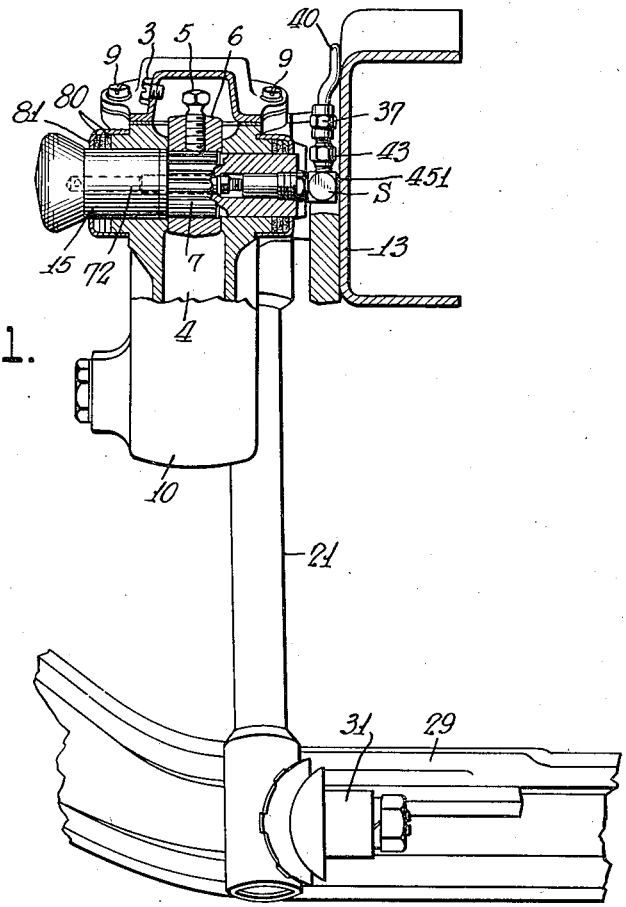
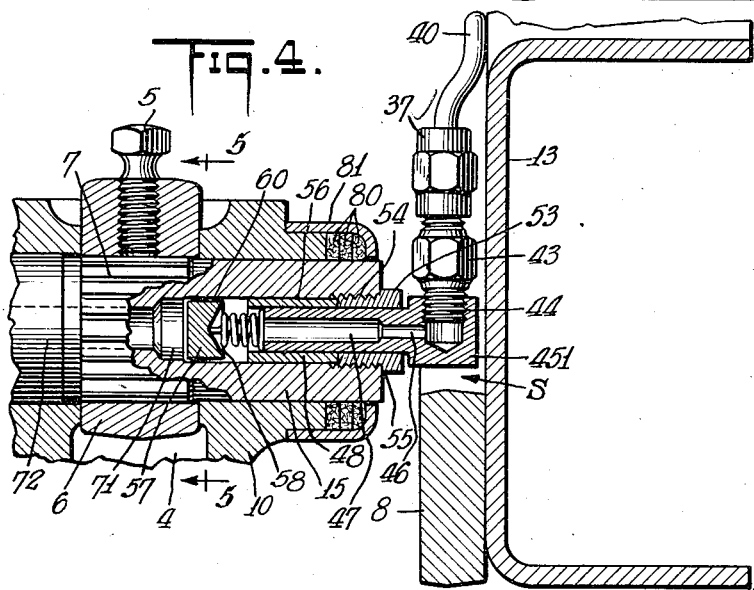
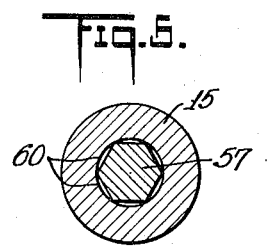
INVENTOR
*Joseph Bijur*
BY
ATTORNEYS Dec. 31, 1935.   J. BIJUR   2,025,713
LUBRICATION
Filed Feb. 28, 1931   3 Sheets-Sheet 2
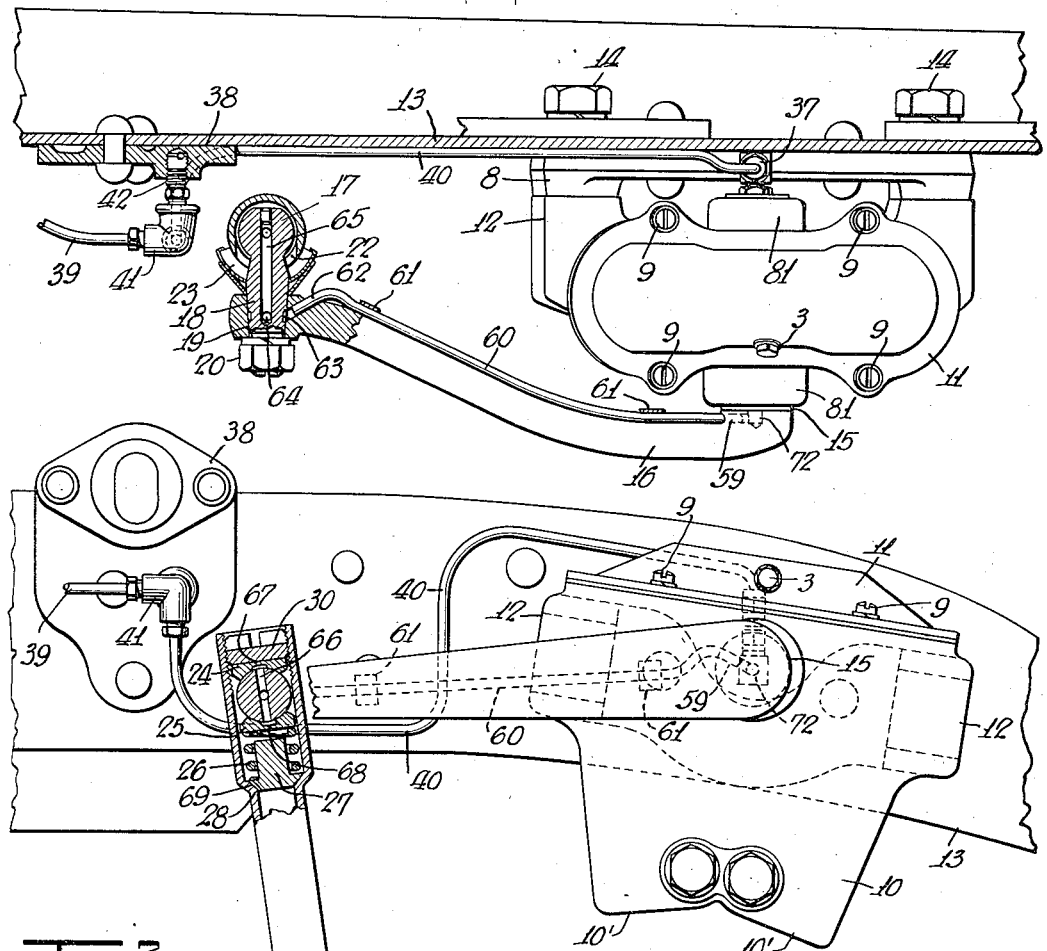
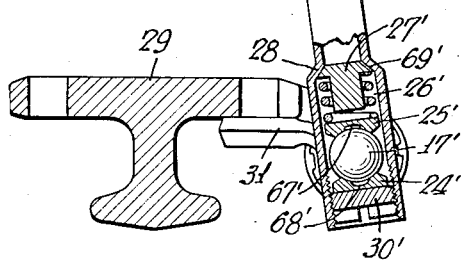
INVENTOR
Joseph Bijur
BY
ATTORNEYS Dec. 31, 1935. J. BIJUR 2,025,713
LUBRICATION
Filed Feb. 28, 1931 3 Sheets-Sheet 3

INVENTOR
Joseph Bijur
BY
ATTORNEYS

Patented Dec. 31, 1935

2,025,713

UNITED STATES PATENT OFFICE 2,025,713

LUBRICATION

Joseph Bijur, New York, N. Y., assignor to Auto Research Corporation, a corporation of Delaware Application February 28, 1931, Serial No. 518,934

35 Claims. (Cl. 184—7)

This invention relates to liquid distribution, and more especially to, lubrication and particularly relates to the lubrication of shock absorbers from central chassis lubricating systems.

Among the objects of the present invention are to provide a compact and convenient swivel construction which will enable the transfer of lubricant from one structure to another pivotally connected thereto without any substantial lubricant loss; which may be readily manufactured, shipped and handled as a substantially complete unit; which may be readily assembled with a lubricated structure by making slight changes, as drilling and tapping, said structure; which in final installation does not require the cooperation and addition of any special parts or elements; and which, when so installed, will add no material amount of bulk to the structure.

Another object of the present invention is to provide a swivel construction for permitting lubricant to flow from one structural element to another structural element turning in respect thereto, which element will be of such construction as to automatically take up wear therein and prevent leakage even after usage for long periods of time, and which at the same time may be altogether constructed of metallic elements and be devoid of packing.

Another object of the present invention is to provide a convenient readily applicable method of lubricating shock absorbers, and particularly for conveying lubricant from the chassis frame, as from a chassis lubricating system, to the oscillating arm and link of said shock absorbers with assurance that said lubricant will not mix with the shock absorber fluid and will not be lost in being transferred to the swivelling shock absorber shaft and arm.

Other objects are in part obvious and in part pointed out hereinafter.

Although the present invention is broadly applicable to supplying lubricant to the bearings of, or associated with, swiveling structures, it will be specifically described in connection with the bearings of shock absorber links and arms, particularly where the casings of these shock absorbers are attached directly or adjacent to the chassis frame of an automobile.

A feature of the present invention consists in introducing lubricant into the central shaft of shock absorbers from a source of supply on the chassis and in removing said lubricant either from the same end of the shaft or from the opposite end thereof into or along the arm structure of the shock absorber and from thence into the link structure, an exterior conduit desirably being provided along the arm and the link desirably being of hollow construction so as to permit lubricant to flow from the upper bearing thereof to the lower.

Inasmuch as the central shaft of the shock absorber is frequently in part or whole lubricated by means of the shock absorber fluid, the ends of the shock absorber shaft may be packed or similarly treated to prevent intermixture between the shock absorber fluid and the lubricant for the bearings at the ends of the arm and link thereof, or to prevent loss of said shock absorber fluid from the ends of the shaft.

The source of supply may conveniently take the form of a central chassis lubricating system and the adjacent conduit of said system may extend along the same or other side of the chassis frame to which the casing of the shock absorber is attached, said source of supply being connected to the subsidiary conduit system associated with shock absorber by a suitable branching arrangement.

In the preferred embodiment the branching arrangement includes a pressure-absorbing flow-metering outlet or drip plug and a swivel arrangement, which in the embodiment shown consists of a longitudinal stem with an enlarged head, said stem being provided with a threaded sleeve rotatable with the shock absorber shaft relatively to the stem to hold the unit in position in a socket which may be in either end of the shock absorber shaft.

The swivel may be provided with a spring reacting against the bottom of the socket to make a lubricant-tight bearing between the rotatable threaded sleeve and the fixed stem. The flow metering outlet or drip plug may be attached directly to the head of the swivel, or if it would be inaccessible, liable to injury or subject to heat from the exhaust connections in such position, it may be desirably positioned upon the chassis frame a substantial distance away from the shock absorber and be connected thereto by an appropriate tail pipe arrangement.

In the accompanying drawings in which there are shown several of the various possible embodiments of the features of this invention:

Figs. 1 to 6 illustrate one embodiment of the invention, particularly applicable to shock absorbers attached to the front axle, Figs. 1, 2 and 3 being respectively front, top and side views, in fragmentary section, Fig. 4 being an enlarged side sectional view of the swivel construction, Fig. 5 being a transverse sectional view upon the line 5—5 of Fig. 4 and Fig. 6 being a perspective longitudinal sectional view of the swivel unit;

Fig. 7 illustrates a slightly modified swivel construction, and

Fig. 8 illustrates another embodiment, in top view and in fragmentary section similar to Fig. 2.

In Figs. 1 to 6 the shock absorber has a casing 10 provided with the piston cylinders 10'—10' and with an appropriate cover 11 attached thereto by the screws 9. The casing is attached by suitable legs 12 to the exterior side of the chassis channel frame 13 by means of the bolts 14, the spacer member 8 being interposed between said legs and the chassis channel member. Passing through and bearing in the upper portion of the shock absorber casing 10 is the shaft 15. The shaft 15 is intermediately splined at 7 and carries the piston rocker arm 6 fixed in position thereupon by the set screw 5. The pistons (not shown) of the shock absorber work in a liquid contained in the chamber 4 in the casing 10, which liquid is replenished through the opening 3. Integrally connected with the shaft 15 is the arm 16, the end of which arm is provided with the horizontally extending ball stud 17. The shank 18 of the ball stud 17 is firmly gripped within a tapered opening in the end of said arm by means of the nut 20. The ball stud 17 projects into the hollow link 21 through an opening 22, said opening being substantially closed against dust and moisture by the cover 23. Within the top of the link 21 are the ball cups 24 and 25, the upper cup being held in position by the insert 30 and the lower cup being pressed against the ball 17, and in turn pressing said ball 17 against the upper cup 24, by the stressed spring 26 retained by the shouldered plug 27 resting upon the reduction 28 in the link. The lower end of the link 21 is symmetrical with the upper end of the link and is provided with the same elements as the upper end, similar functioning parts being designated by the same numerals primed. The ball stud 17' (in this position unbored) extends horizontally outwardly from a bracket 31 attaching it to the axle 29 illustratively shown as the front axle. The construction described up to this point, taken by itself, is not part of the present invention.

Extending along the chassis frame 13 and forming part of a central lubricating system is the conduit 39 upon which is a junction 41 supplying the bearing structure 38 of a brake operating shaft by means of the flow metering device or drip plug 42, said conduit being continued by the pipe 40 and coupled at 37 to the flow metering device or drip plug 43 attached to the swivel S now to be described.

The swivel S (see particularly Fig. 6) consists of a body member 45 with a head 451 provided with a transverse tapped socket 44 for attachment of the end of a flow metering device, drip plug or pipe end and with a shank 452 provided with axial passageways 46 and 47 of increasing diameter toward the outlet. On the outside of the shank is press-fitted or otherwise permanently fixed in a liquid-tight manner a sleeve 48 which projects beyond, and forms, with the end of the shank 452, a socket for retaining the outer end of the coil spring 49. The other end 50 of the spring 49 cooperates with a conical depression 58 in the polygonal insert 57, either square or hexagonal, the latter being shown, in bottom of the sockets 56 (see particularly Fig. 4), which socket receives the shank 452 and forms a bearing for the sleeve 48 press-fitted thereupon. The spring 49 presses the body member 45 and particularly the outer end of the sleeve 51 against the inner end 52 of the threaded bushing 53 encircling the stem 452, which sleeve is screwed into the tapped portion 54 of the socket 56 to hold the swivel in place.

The socket 56 communicates with the socket 71 and the bore 72 in the shock absorber shaft through the interstices 60 between the plug 57 and the socket 56 (see particularly Fig. 5), the end of the bore 72 communicating with another bore 59. Inserted in the bore 59 is the end of the pipe 60 which is attached to the rear side of the shock absorber arm 16 by clips 61, the other end 62 of the pipe 60 being inserted into a bore communicating with a circumferential groove 63 about the shank 18 of the ball stud 17 within the eye 19 at the outer end of the shock absorber arm 16. The circumferential groove 63 communicates by means of radial bores 64, an axial bore 65 and radial bores 66 with the bearing surfaces of the cups 24 and 25, said bearing surfaces being provided with grooves 67 and 68 to distribute the lubricant thereover. Any excess lubricant from the upper ball stud 66 flows downwardly through the hollow link 21 passing through the grooves 69 and 69' in the plugs 27 and 27' to lubricate the lower ball, the bearing cups of which are similarly provided with lubricant distributing grooves 67' and 68'.

In operation, the shock absorber shaft 15 will be lubricated by the fluid in the casing 10 and such fluid will be prevented from escaping by reason of the gaskets 80, preferably of cork, the middle one of which may be of a rubber composition, which gaskets are retained in place and firmly clamped against the shaft 15 by means of the covers 81, said gaskets and cover being symmetrically applied in the embodiment shown at both ends of the shock absorber shaft. The lubricant, whether supplied through a flow metering device 43 or directly fed into the socket 44 by any other means, flows through the passageways 46, 47, 71, 72 and 60 and through the bores in the ball stud 17 to the bearings thereof, excess lubricant flowing through the hollow tube to the lower ball stud bearings in the manner indicated above.

Leakage out of the swivel structure could only take place through the long bearing surfaces between the socket and the sleeve 48, past the contacting surfaces 51 and 52, forming a transverse annular bearing, which are tightly pressed together by the spring 49 and then through the bearing surface between the bushing 53 and the tubular shank 452, the head of the nut or bushing 53 being clamped against the inner end of the shock absorber shaft 15 at 55 (see Fig. 4), so that no leakage can take place past the threads 54 of said bushing. There will be little tendency for any lubricant to escape along this tortuous path, particularly because of the tight fit between the surfaces 51 and 52, any wear between said surfaces being automatically taken up by the spring 49.

In Fig. 7 is shown a slightly modified swivel construction attached to a shock absorber (similarly functioning parts being designated by the same numerals as in Figs. 1 to 6 but primed), in which the swivel is provided with an elongated head 451' which extends through opening 89 in the chassis frame 13' and the spacer or filler block 8'. This arrangement being particularly adaptable where it is desirable to have the lubricant conduit 40' extend inside of the channel frame instead of on the outside thereof, as shown in Figs. 1 to 6. In this embodiment the flow metering device or drip plug is not attached directly to the swivel but may be connected thereto by the pipe 40' and the adapter 37'.

It will be noted in both of the embodiments previously described that the filler blocks 8 and 8' space the inner ends of the shafts 15 and 15' a sufficient distance from the frames 13 and 13' to enable attachment of the swivels S and S', and also in the embodiment of Figs. 1 to 6, the attachment of a drip plug to the swivel S.

In Fig. 8 is shown a modified construction (similarly functioning parts being designated by the same numerals as in Figs. 1 to 6 but with a superior 2), where the lubricant is admitted to and removed from the same end of the shock absorber shaft $15^2$, a swivel construction $S^2$ being utilized substantially of the same construction as already described in the case of the embodiment of Figs. 1 to 6. In this embodiment the bottom of the socket $56^2$ is provided with a conical depression $58^2$ into which the end of the spring is pressed, a bore $59^2$ in the inner end of the shock absorber arm communicating with the inner end of said socket $56^2$ and supplying lubricant to the conduit $60^2$, in this case clipped at $61^2$ to the front of the shock absorber arm. In this embodiment a junction 84 is used to couple two conduit lengths $39^2$ and is fitted on top of the drip plug or other flow metering device $43^2$, which plug or device extends through the frame member $13^2$ and fits into a connector or adapter 86 supplying the pipe $40^2$ connected at its other end to the swivel $S^2$ and supported intermediately by the clip 88 and screws 92 from the cover $11^2$ of the shock absorber casing.

The construction of Fig. 8 is particularly adapted to shock absorber constructions in which there is sufficient space at the front end of the shaft 15 of the shock absorber out of range of the wheel or other associated automotive mechanism, the embodiments of Figs. 1 to 7 being more suitable when there is a possibility of contact between the wheel of the automotive vehicle and any protruding attachment at said end of the shock absorber shaft. In this embodiment the spacer or filler block between the shock absorber casing and the frame may be omitted since all lubricant connections may be made from the front.

The construction of Fig. 8 (and also of Fig. 7) is also particularly adapted to shock absorbers supplied from centralized systems as described in my Patents Nos. 1,632,771 and 1,632,772, where such shock absorbers are positioned closely adjacent to the hot exhaust connections, and where it is desired to maintain all the drip plugs at a uniform temperature to assure proper proportioning, the drip plug in this case being located sufficiently away from said hot exhaust connection so as not to be substantially heated thereby and being connected to the shock absorber structure by the tail pipe $40^2$.

In the swivel constructions shown, the fixed element 45 of the swivel is held fixed to the frame by the tubing 40 which is desirably of hard brass for this reason, the other conduits of the chassis system 39 being of relatively soft copper.

The swivel construction of the present invention may also under appropriate conditions be applied to other swivelling connections such as to steering knuckles and steering gear lubrication.

As many changes could be made in the above construction, and many apparently widely different embodiments of this invention could be devised without departing from the scope thereof, it is intended that all matter contained in the above description or shown in the accompanying drawings shall be interpreted as illustrative and not in a limiting sense.

I claim:

1. In combination with a vehicle mechanism including a casing, a shaft protruding from said casing, an outwardly extending arm substantially rigid with said shaft and a link pivotally connected to the end of said arm and adapted to be connected to a part of the vehicle moving relative to the part to which the casing is to be attached; a lubricating installation for the pivotal bearings of said link, comprising a socket in one end of said shaft, a swivel enclosed in said socket, a lubricant source supplying lubricant to said swivel and conduits along the arm and link for conducting lubricant from said swivel to said bearing.

2. In combination with a vehicle shock absorber including a casing, a shaft projecting from said casing, an outwardly extending arm substantially rigid with said shaft and a link pivotally connected to the end of said arm and adapted to be connected to a part of the vehicle moving relatively to the part to which the casing is to be attached; a lubricating installation for the pivotal bearings of said link comprising a socket in one end of said shaft, a swivel enclosed in said socket, a lubricant source supplying lubricant to said swivel and conduits along the arm and link for conducting lubricant from said swivel to said bearings.

3. A shock absorber of the type comprising a casing having a protruding shaft, an arm rigidly affixed to said shaft and a link pivoted to the end of said arm and adapted to be pivoted at its opposite end to a part of a vehicle moving relative to a vehicle part mounting said casing; said shock absorber including conduit means leading from the casing to both ends of said link, an inlet mounted in said shaft coaxial therewith and swivelled thereinto, whereby the bearings of said shock absorber may be lubricated from a centralized lubricating system on the vehicle by connection with an outlet fitting of said system at said inlet.

4. A shock absorber of the type comprising a casing having a protruding shaft, an arm rigidly affixed to said shaft and a link pivoted to the end of said arm and adapted to be pivoted at its opposite end to a part of a vehicle moving relative to a vehicle part mounting said casing; said shock absorber including a dispensing cavity in said shaft, conduit means leading from the cavity to both ends of said link, an inlet mounted in said shaft coaxial therewith, swivelled thereinto and communicating with said cavity, whereby the bearings of said shock absorber may be lubricated from a centralized lubricating system on the vehicle by connection with an outlet fitting of said system at said inlet.

5. A shock absorber comprising a casing, a pivoted operating mechanism therein, an external linkage with pivot bearings, a flow metering inlet fixed with respect to said casing and conduit means communicating with said inlet extending from said casing along said linkage to the bearings thereof, said conduit means including a swivel coaxial with the pivotal axis of the operating mechanism in the casing and accommodating the pivoting movement of the linkage relative to the casing.

6. In combination with a structure having an encased mechanism, a support therefor adjacent one side thereof, an external linkage connected to said mechanism and a shaft extending through the casing connecting said mechanism and said linkage; a lubricating installation comprising a lubricant inlet conduit transverse to said shaft and leading to one end thereof, a swivel arrangement fed therefrom, a second lubricant conduit longitudinal of said shaft communicating with said lubricant inlet conduit through said swivel arrangement and a third lubricant outlet conduit, also transverse to said shaft, leading from said longitudinal conduit to said external linkage, said swivel arrangement including two elongated telescoping tubular elements.

7. In combination with a vehicle mechanism including a casing, a shaft projecting from said casing, an outwardly extending arm substantially rigid with said shaft and a link pivotally connected to the end of said arm, having a bearing at said pivotal connection, and connected to a part of the vehicle moving relatively to the part to which the casing is to be attached; a lubricating installation for said pivotal bearing of said link comprising a passageway through said shaft from end to end thereof, a socket in the end of said shaft opposite that carrying said arm, a swivel inserted in said socket, a passageway along the arm for conducting said lubricant from said passageway to said bearing and a lubricant source connected to said swivel.

8. In combination with a vehicle shock absorber including a casing, a shaft projecting from said casing, an outwardly extending arm substantially rigid with said shaft and a link pivotally connected to the end of said arm, having a bearing at said pivotal connection, and connected to a part of the vehicle moving relatively to the part to which the casing is to be attached; a lubricating installation for the pivotal bearing of said link comprising a passageway through said shaft from end to end thereof, a socket in the end of said shaft opposite that carrying said arm, a swivel inserted in said socket, a passageway along the arm for conducting said lubricant from said passageway to said bearing and a lubricant source connected to said swivel.

9. In combination with a shock absorber of the type including a casing attached to the side frame of the chassis of an automotive vehicle, a horizontal shaft passing through said casing, an arm attached to the end of said shaft removed from said place of attachment and a link pivotally connected to the end of said arm and to an axle of said vehicle; a lubricating installation for the pivotal bearings of said link comprising a socket in the end of the shaft adjacent the chassis, a bore passing longitudinally through said shaft and communicating with the bottom of said socket, a swivel associated with said socket, a source of supply rigid with said chassis supplying said swivel, and passageways along said arm and said link for conducting lubricant from the outer end of said bore to said bearings, supplied with lubricant from said swivel through said shaft bore.

10. A shock absorber of the type comprising a casing having a protruding shaft, an arm rigidly affixed to said shaft and a link pivoted to the end of said arm and adapted to be pivoted at its opposite end to a part of a vehicle moving relative to a vehicle part mounting said casing; said shock absorber including a dispensing cavity in said shaft, conduit means leading from the cavity to both ends of said link, an inlet mounted in said shaft coaxial therewith, swivelled thereinto, and communicating with said cavity, whereby the bearings of said shock absorber may be lubricated from a centralized lubricating system on the vehicle by connection with an outlet fitting of said system at said inlet, said cavity extending through a greater part of the length of said shaft.

11. A shock absorber comprising a casing, a pivoted operating mechanism therein, an external linkage with pivot bearings at one side of said casing, a drip plug fixed at the other side of said casing and conduit means from said drip plug extending through said casing and along said linkage from said casing to the bearings of the latter, said conduit means including a swivel coaxial with the pivotal axis of the operating mechanism in the casing and accommodating the pivoting movement of the operating mechanism relative to the casing.

12. In combination with a structure having an encased mechanism immersed in a lubricating liquid and external linkage on the side of the structure opposite that on which it is adapted to be supported; a lubricating installation therefor comprising a source adjacent the supporting structure and lubricant conduit means extending through said casing from said source to the external linkage, the portion of said conduit means passing through the casing being free from communication with the lubricating liquid body inside of the casing.

13. A shock absorber of the type comprising a casing having moving parts therein, bearings for said parts, a lubricating liquid immersing said parts and wetting said bearings and an exterior linkage having bearings, said shock absorber including means for lubricating the bearings of said exterior linkage comprising lubricant conduit means extending through the interior of said casing along said exterior linkage to the various bearings thereof and means exteriorly of said casing for admitting lubricant to said conduit means, the portion of the lubricant conduit means within said casing being free from communication with respect to the liquid within said casing.

14. In combination with a shock absorber of the type including a liquid-containing casing, a shaft extending through and bearing within said casing, said bearings being internally lubricated by said liquid, an outwardly extending arm attached to the end of said shaft, a link extending between and pivotally connected to the end of said arm and to an axle, a lubricant conduit system passing longitudinally through the shaft and inside of said shaft bearings, along the arm and said link to supply the link and packing materials associated with said shaft to prevent intermixture of liquid from the instrument casing with the lubricant in the lubricant conduit system.

15. In combination with a vehicle mechanism including a casing, a shaft projecting from said casing, an outwardly extending arm substantially rigid with said shaft and a link pivotally connected to the end of said arm and adapted to be connected to a part of the vehicle moving relatively to the part to which the casing is attached; a lubricating installation for the pivotal bearings of said link comprising a socket in the end of said shaft adjacent said arm, a swivel enclosed therein, a lubricant inlet connected to said swivel and passageways along said arm and along said link conducting lubricant from the inside of said socket and from said swivel to said bearings.

16. In combination with a vehicle shock absorber instrument including an instrument casing, a shaft projecting from said casing, an outwardly extending arm substantially rigid with said shaft and a link pivotally connected to the end of said arm, having a bearing at said pivotal connection and attached to a part of the vehicle moving relatively to the part to which the instrument is to be attached; a lubricating installation for said pivotal bearing of said link comprising a socket in the end of said shaft adjacent said arm, a swivel enclosed therein, a lubricant inlet connected to said swivel and a passageway along said arm conducting lubricant from the inside of said socket and from said swivel to said bearing.

17. In combination with a shock absorber of the type including a casing attached to the side frame of the chassis of an automotive vehicle, a horizontal shaft passing through said casing, an arm attached to the ends of said shaft removed from said place of attachment and a link pivotally connected to the end of said arm and to an axle of said vehicle; a lubricating installation for the pivotal bearings of said link comprising a socket in the end of the shaft removed from the chassis, a swivel element associated with said socket, a conduit leading from the frame to the outer end of said swivel and passageways along the arm and along the link conducting lubricant from the inner portion of said socket inside of said swivel to said bearings.

18. A shock absorber of the type comprising a casing having a protruding shaft, an arm rigidly affixed to said shaft and a link pivoted to the end of said arm and adapted to be pivoted at its opposite end to a part of a vehicle moving relative to a vehicle part mounting said casing; said shock absorber including a dispensing cavity in said shaft, conduit means leading from the cavity to both ends of said link, an inlet mounted in said shaft coaxial therewith, swivelled thereinto and communicating with said cavity, whereby the bearings of said shock absorber may be lubricated from a centralized lubricating system on the vehicle by connection with an outlet fitting of said system at said inlet, said cavity being formed in the end of shaft adjacent the inlet.

19. In combination with a shock absorber of the type including a casing attached to the side frame of the chassis of an automotive vehicle, a horizontal shaft passing through said casing, an arm attached to the end of said shaft removed from said place of attachment and a link pivotally connected to the end of said arm and to an axle of said vehicle; a gravity lubricating installation for the pivotal bearings of the link supplied from one of the outlets of a central chassis lubricating system of the drip plug type comprising a drip plug outlet positioned upon the frame a substantial distance away from said casing, a swivel construction at the outer end of said shaft, a conduit leading from said drip plug to the part of the swivel rigid with the casing and passageways along the arm and the link for conducting lubricant from said swivel to said bearings.

20. In combination with a motor vehicle of the type including a frame with channel side members, each provided with a central web and inwardly directed side flanges, an axle, and shock absorbers connected between such side members and said axle, the casings of which shock absorbers are positioned closely adjacent to the webs of said side members but substantially spaced therefrom; a lubricating installation comprising lubricant conduits extending along the webs of said side members and lubricant inlet fittings transverse to said side members extending from said conduit across the spaces between said casings and the webs of the side members into the shock absorber structure.

21. In combination with a shock absorber of the type including a casing with an internal reservoir attached to the side frame of the chassis of an automotive vehicle, a horizontal shaft passing through said casing, an arm attached to the end of said shaft removed from said place of attachment and a link pivotally connected to the end of said arm and to an axle of said vehicle; separate lubricating installations for the bearings of said shaft and said link comprising separate lubricant inlets positioned closely adjacent to each other and adjacent the top of the casing and a conduit system leading along the arm to said link, the lubricant inlet for the shaft bearings being above the shaft and emptying into said reservoir and the lubricant inlet for the link bearings being formed in part in the shaft and supplying said conduit system.

22. In a lubricating installation for a swivelling structure supported from a relatively fixed structure, a source of supply upon said fixed structure, a piping connection from said source of supply to said swiveling structure and a lubricant-conducting swiveling combination provided with relatively fixed and rotatable elements adapted to have rapid relative reciprocatory movements of slight amplitude, said elements being respectively attached to said piping connection and to the swiveling structure associated with said swiveling structure at the axis thereof, said connection being made of rigid hard brass tubing so as to retain the fixed portion of said swiveling combination in relatively fixed relationship in respect to said fixed structure.

23. A central chassis lubricating installation for the link bearings of shock absorbers, including casings attached to the chassis frames, shafts extending through said casings, arms extending outwardly from the ends of said shafts and links connected between an axle and the ends of said arm, said installation comprising lubricant-conducting swivel combinations associated with said shafts having a portion fixed with respect to the shaft and a portion fixed with respect to the chassis frame, a source of lubricant upon said chassis frame, soft copper tubing extending along said shaft frame to adjacent the shock absorber casings and hard brass tubing from said copper tubing to the portions of the swivel combinations fixed with respect to the chassis frame.

24. In combination with a structure having an encased mechanism, a support therefor adjacent one side thereof, an external linkage connected to said mechanism and a shaft extending through the casing connecting said mechanism and said linkage; a lubricating installation comprising a lubricant inlet conduit transverse to said shaft and leading to one end thereof, a second lubricant conduit longitudinal of said shaft communicating with said lubricant inlet conduit and a third lubricant outlet conduit also transverse to said shaft, leading from said longitudinal conduit to said external linkage, the connection between the inlet conduit and the shaft including a swivel arrangement.

25. In combination with a structure having an encased mechanism, a support therefor adjacent one side thereof, an external linkage connected to said mechanism and a shaft extending through the casing connecting said mechanism and said linkage; a lubricating installation comprising a lubricant inlet conduit transverse to said shaft and leading to one end thereof, a second lubricant conduit longitudinal of said shaft communicating with said lubricant inlet conduit and a third lubricant outlet conduit, also transverse to said shaft, leading from said longitudinal conduit to said external linkage, the longitudinal conduit being axial of the shaft and consisting in part of a swivel arrangement.

26. In combination with a structure having an encased mechanism, a support therefor adjacent one side thereof, an external linkage connected to said mechanism and a shaft extending through the casing connecting said mechanism and said linkage; a lubricating installation comprising a lubricant inlet conduit transverse to said shaft and leading to one end thereof, a second lubricant conduit longitudinal of said shaft communicating with said lubricant inlet conduit and a third lubricant outlet conduit also transverse to said shaft, leading from said longitudinal conduit to said external linkage, the inlet conduit leading to said shaft and the outlet conduit leading to said linkage being connected to opposite ends of said shaft.

27. In combination with a structure having an encased mechanism, a support therefor adjacent one side thereof, an external linkage connected to said mechanism and a shaft extending through the casing connecting said mechanism and said linkage; a lubricating installation comprising a lubricant inlet conduit transverse to said shaft and leading to one end thereof, a second lubricant conduit longitudinal of said shaft communicating with said lubricant inlet conduit and a third lubricant outlet conduit also transverse to said shaft, leading from said longitudinal conduit to said external linkage, the inlet conduit leading to the shaft and the outlet conduit leading from the shaft being connected to the same end of said shaft.

28. In combination with a motor vehicle of the type including a frame with channel side members, each provided with a central web and inwardly directed side flanges, an axle, and shock absorbers connected between such side members and said axle, the casings of which shock absorbers are positioned closely adjacent to said side members but substantially spaced therefrom; a lubricating installation comprising a lubricant conduit along said side member and a lubricant inlet extending from said conduit to said casing across the space between said casing and the side member into the shock absorber structure, the conduit extending along the longitudinal member of the chassis frame on the same side to which the shock absorber is attached and the shock absorber casing being so spaced from the side frame as to permit of the convenient positioning of a lubricant inlet therebetween.

29. In combination with a motor vehicle of the type including a frame with channel side members, each provided with a central web and inwardly directed side flanges, an axle, and shock absorbers connected between such side members and said axle, the casings of which shock absorbers are positioned closely adjacent to the webs of said side members but substantially spaced therefrom; a lubricating installation comprising a lubricant conduit along the web of said side member inside of said flanges and a lubricant inlet extending from said conduit to said casing across the space between said casing and the web of the side member into the shock absorber structure, the lubricant conduit extending along the opposite side of the web of the side member of the chassis frame and the lubricant inlet extending both through the web of said member and across the space between said conduit and said casing into the shock absorber structure.

30. In a lubricating installation for a mechanism having relatively moving structural parts each carrying bearings to be lubricated, said installation being of the type having a central lubricant source, and a branched piping system with a single inlet from said source and a plurality of outlets to said bearings, each outlet including a flow metering unit; a swivel construction in said piping system between said relatively moving structural parts serving to connect the portions of the piping system carried by each part, said swivel construction comprising a longitudinal member with a passageway therethrough to be inserted within a socket in a lubricated structure, means positioned between the inlet and outlet ends of said longitudinal member for retaining said swivel within said socket and means for causing lubricant tight contact between the longitudinal member and said retaining means, said last mentioned means including a sleeve rigidly fitted to the outlet end of the longitudinal member and projecting beyond the outlet end of said member, said piping system being formed in part of relatively inflexible tubing, the latter being connected to said longitudinal member and fixing said longitudinal member against movement in respect to one of said structural parts.

31. In a lubricating installation for a mechanism having relatively moving structural parts each carrying bearings to be lubricated, said installation being of the type having a central lubricant source, and a branched piping system with a single inlet from said source and a plurality of outlets to said bearings, each outlet including a flow metering unit, a swivel construction in said piping system between said relatively moving structural parts serving to connect the portions of the piping system carried by each part, said swivel construction comprising a longitudinal fixed swivel member adapted to serve as a lubricant inlet and with a shank intermediately of reduced diameter, a rotatable sleeve fitting upon the reduced portion of said shank and means associated with the end of said shank for pressing the said fixed member against said rotatable sleeve to form a substantially lubricant-tight bearing surface, said bearing surface being perpendicularly transverse to the axis of the construction, said piping system being formed in part of relatively inflexible tubing, the latter being connected to said longitudinal member and fixing said longitudinal member against movement in respect to one of said structural parts.

32. In a lubricating installation for a mechanism having relatively moving structural parts each carrying bearings to be lubricated, said installation being of the type having a central lubricant source, and a branched piping system with a single inlet from said source and a plurality of outlets to said bearings, each outlet including a flow metering unit; a swivel construction in said piping system between said relatively moving structural parts serving to connect the portions of the piping system carried by each part, said swivel construction comprising a longitudinal fixed swivel member with a head adapted to serve as a lubricant inlet and with a shank intermediately of reduced diameter, a rotatable externally threaded sleeve fitting upon the reduced portion of said shank and resilient means associated with the end of said shank for pressing the said fixed member against said rotatable sleeve to form a substantially lubricant-tight surface, said shank being provided with a socket at its inner end and said resilient means consisting of a coil spring, one end of which tightly fits within said socket, said piping system being formed in part of relatively inflexible tubing, the latter being connected to said longitudinal member and fixing said longitudinal member against movement in respect to one of said structural parts.

33. In a lubricating installation for a mechanism having relatively moving structural parts each carrying bearings to be lubricated, said installation being of the type having a central lubricant source, and a branched piping system with a single inlet from said source and a plurality of outlets to said bearings, each outlet including a flow metering unit; a swivel construction in said piping system between said relatively moving structural parts serving to connect the portions of the piping system carried by each part, said swivel construction comprising a longitudinal member with a passage therethrough to be inserted within a socket in a lubricant structure, a flow controlling instrumentality associated with the inlet end of said member, means positioned between the inlet and outlet ends of said longitudinal member for retaining said swivel within said socket and means for causing lubricant-tight contact between longitudinal member and said attaching means, said contact being along an annular face perpendicular to the axis of the construction, said piping system being formed in part of relatively inflexible tubing, the latter being connected to said longitudinal member and fixing said longitudinal member against movement in respect to one of said structural parts.

34. In a lubricating installation for a mechanism having relatively moving structural parts each carrying bearings to be lubricated, said installation being of the type having a central lubricant source, and a branched piping system with a single inlet from said source and a plurality of outlets to said bearings, each outlet including a flow metering unit; a swivel construction in said piping system between said relatively moving structural parts serving to connect the portions of the piping system carried by each part, said swivel construction comprising major relatively fixed and minor relatively moving elements, the former consisting of an elongated longitudinal stem member to be fitted within a socket in a lubricated structure and the latter consisting of a sleeve intermediately encircling said stem to retain it rotatably within said socket, said construction forming three bearing surfaces, an outer bearing surface along the outside of the inner end of the stem, an intermediate bearing surface between the sleeve and the stem and a perpendicularly transverse bearing surface connecting said two first mentioned longitudinal bearing surfaces between the stem and the sleeve, and means to exert pressure upon the last mentioned bearing surface, said piping system being formed in part of relatively inflexible tubing, the latter being connected to said longitudinal member and fixing said longitudinal member against movement in respect to one of said structural parts.

35. In a lubricating installation for a mechanism having relatively moving structural parts each carrying bearings to be lubricated, said installation being of the type having a central lubricant source, and a branched piping system with a single inlet from said source and a plurality of outlets to said bearings, each outlet including a flow metering unit; a swivel construction in said piping system between said relatively moving structural parts serving to connect the portions of the piping system carried by each part, said swivel construction comprising a central longitudinal elongated tubular member, the outer end of which is provided with a tapped socket and shouldered, a tubular element rigidly fitted upon the inner end of said member and extending inwardly therebeyond, an annular nut rotatably fitted upon said member between said shoulder and said element, a coil spring tightly fitted at one end within said inward extension of said element, a block to contact with the other end of said spring, and an inlet conduit fitting threaded into said socket, said piping system being formed in part of relatively inflexible tubing, the latter being connected to said longitudinal member and fixing said longitudinal member against movement in respect to one of said structural parts.

JOSEPH BIJUR.